(12) United States Patent
Nakajima

(10) Patent No.: US 12,110,924 B2
(45) Date of Patent: Oct. 8, 2024

(54) SLIDING MEMBER AND METHOD FOR PRODUCING SAME

(71) Applicant: SUMITOMO ELECTRIC INDUSTRIES, LTD., Osaka (JP)

(72) Inventor: Shinnosuke Nakajima, Osaka (JP)

(73) Assignee: SUMITOMO ELECTRIC INDUSTRIES, LTD., Osaka (JP)

(*) Notice: Subject to any disclaimer, the term of this patent is extended or adjusted under 35 U.S.C. 154(b) by 213 days.

(21) Appl. No.: 17/774,355

(22) PCT Filed: Jul. 21, 2020

(86) PCT No.: PCT/JP2020/028337
§ 371 (c)(1),
(2) Date: May 4, 2022

(87) PCT Pub. No.: WO2021/117287
PCT Pub. Date: Jun. 17, 2021

(65) Prior Publication Data
US 2022/0403877 A1 Dec. 22, 2022

(30) Foreign Application Priority Data
Dec. 12, 2019 (JP) ................. 2019-224925

(51) Int. Cl.
*F16C 33/12* (2006.01)
*C09D 127/18* (2006.01)
*F16C 17/02* (2006.01)

(52) U.S. Cl.
CPC .......... *F16C 33/125* (2013.01); *C09D 127/18* (2013.01); *F16C 17/02* (2013.01)

(58) Field of Classification Search
CPC ... C09D 127/18; B32B 15/085; B32B 27/322; B32B 27/16; B32B 15/18;
(Continued)

(56) References Cited

U.S. PATENT DOCUMENTS
2016/0186617 A1   6/2016   Fukutomi et al.

FOREIGN PATENT DOCUMENTS
JP    H03-251701 A    11/1991
JP    2011-208802 A   10/2011
(Continued)

OTHER PUBLICATIONS

International Search Report for corresponding Application No. PCT/JP2020/028337, mailed Oct. 13, 2020.

*Primary Examiner* — Vishal V Vasisth
(74) *Attorney, Agent, or Firm* — Renner, Otto, Boisselle & Sklar, LLP

(57) ABSTRACT

A sliding member according to an aspect of the present disclosure includes: a sliding member body containing a metal as a main component; and an outer layer laminated directly on a surface of the sliding member body and containing a crosslinked fluorine resin as a main component, and an arithmetic average roughness Ra1 of a surface having a waveform obtained by extracting a frequency component of a region having waviness having a frequency of not lower than 0.1 μm and not higher than 100.0 μm on a surface of the outer layer through fast Fourier transform processing, and performing inverse Fourier transform processing on data of a frequency component of a region having waviness having a frequency of not lower than 0.1 μm and not higher than 10.0 μm out of the extracted frequency component, is not greater than 0.035 μm.

7 Claims, 2 Drawing Sheets

(58) Field of Classification Search
CPC ........ B32B 2307/538; B32B 2307/746; B32B 2250/02; B32B 2307/732; B32B 2605/08; F16C 33/205; F16C 33/124; F16C 33/125; F16C 33/14; F16C 17/02; F16C 33/208; F16C 33/106; F16C 17/00; F16C 2208/30; F16C 2360/00; F16C 2223/32
See application file for complete search history.

(56) References Cited

FOREIGN PATENT DOCUMENTS

| | | |
|---|---|---|
| JP | 2012-011676 A | 1/2012 |
| JP | 2014-046673 A | 3/2014 |
| JP | 2017-095753 A | 6/2017 |
| JP | 2018-179079 A | 11/2018 |

SLIDING MEMBER AND METHOD FOR PRODUCING SAME

This application is a 371 of PCT/JP2020/028337, filed Jul. 21, 2020.

TECHNICAL FIELD

The present disclosure relates to a sliding member and a method for producing the same.

BACKGROUND ART

A sliding member of a product used in oil such as an oil pump for feeding engine oil under pressure to various locations such as an engine interior in an internal combustion engine is required to have low adhesiveness, wear resistance, and heat resistance in oil. Crosslinked fluorine resin has been studied as a coating agent for a rotor that is a sliding portion of such an oil pump.

For example, coating a base material, composed of a sliding member body, with a fluorine resin irradiated with ionizing radiation has been proposed (see PATENT LITERATURE 1).

CITATION LIST

Patent Literature

PATENT LITERATURE 1: Japanese Laid-Open Patent Publication No. 2011-208802

SUMMARY OF THE INVENTION

Technical Problem

A sliding member according to an aspect of the present disclosure includes: a sliding member body containing a metal as a main component; and an outer layer laminated directly on a surface of the sliding member body and containing a crosslinked fluorine resin as a main component, and an arithmetic average roughness Ra1 of a surface having a waveform obtained by extracting a frequency component of a region having waviness having a frequency of not lower than 0.1 μm and not higher than 100.0 μm on a surface of the outer layer through fast Fourier transform processing, and performing inverse Fourier transform processing on data of a frequency component of a region having waviness having a frequency of not lower than 0.1 μm and not higher than 10.0 μm out of the extracted frequency component, is not greater than 0.035 μm.

Moreover, a method for producing a sliding member according to another aspect of the present disclosure includes: a step of laminating an outer layer containing a fluorine resin as a main component, directly on a surface of a sliding member body containing a metal as a main component; and a step of irradiating the outer layer with ionizing radiation, and an arithmetic average roughness Ra1 of a surface having a waveform obtained by extracting a frequency component of a region having waviness having a frequency of not lower than 0.1 μm and not higher than 100.0 μm on a surface of the outer layer through fast Fourier transform processing, and performing inverse Fourier transform processing on data of a frequency component of a region having waviness having a frequency of not lower than 0.1 μm and not higher than 10.0 μm out of the extracted frequency component, is not greater than 0.05 μm.

DETAILED DESCRIPTION

Figure 1:
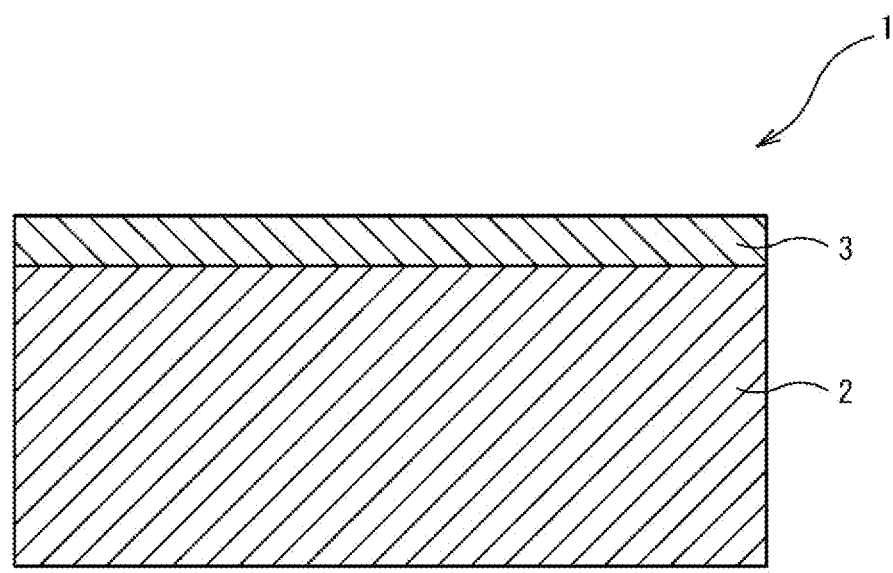
FIG. 1 is a schematic transverse cross-sectional view showing a sliding member according to a first embodiment.

Problems to be Solved by the Present Disclosure

For an oil pump, it is important to manage the clearance between components such as a rotor that is a sliding member, but it is difficult to control the accuracy of the film thickness of an outer layer that contains a crosslinked fluorine resin as a main component and that is an outer layer of the sliding member. As in PATENT LITERATURE 1, in a coating method using a fluorine resin paint, since the accuracy of the film thickness is not sufficient, polishing is performed after an outer layer containing a crosslinked fluorine resin as a main component is formed. In this polishing, in order to set the accuracy of the film thickness of the outer layer, which contains the crosslinked fluorine resin as a main component, to be in a sufficient range, it is necessary to carefully perform polishing using polishing materials from a coarse grit size to a fine grit size of #3000 grit level.

When trying to improve the accuracy of the film thickness by light polishing, the contact angle of oil decreases due to the unevenness remaining on the surface of the outer layer which contains the crosslinked fluorine resin as a main component, and as a result, the oil repellency of the sliding member of the oil pump to the oil may decrease. Furthermore, if the oil repellency of the sliding member decreases, it is difficult to reduce the torque of the sliding member in the oil. On the other hand, if the grit size to be used is increased and excessive polishing is performed, the surface texture of the outer layer containing the crosslinked fluorine resin as a main component becomes smooth, thereby improving the oil repellency to some extent. However, the production efficiency may decrease due to increased processing time.

The present disclosure has been made based on the above-described circumstances, and an object of the present disclosure is to provide a sliding member having excellent oil repellency and torque reduction effect.

Effects of the Present Disclosure

The sliding member according to an aspect of the present disclosure has excellent oil repellency and torque reduction effect.

DESCRIPTION OF EMBODIMENTS OF THE PRESENT DISCLOSURE

First, embodiments of the present disclosure will be listed and described.

A sliding member according to an aspect of the present disclosure includes: a sliding member body containing a metal as a main component; and an outer layer laminated directly on a surface of the sliding member body and containing a crosslinked fluorine resin as a main component, and an arithmetic average roughness Ra1 of a surface having a waveform obtained by extracting a frequency component of a region having waviness having a frequency of not lower than 0.1 µm and not higher than 100.0 µm on a surface of the outer layer through fast Fourier transform processing, and performing inverse Fourier transform processing on data of a frequency component of a region having waviness having a frequency of not lower than 0.1 µm and not higher than 10.0 µm out of the extracted frequency component, is not greater than 0.035 µm.

As a result of intensive studies for the above problem, the present inventor has obtained the following finding. Both the arithmetic average roughness Ra1 of the surface having the waveform and the arithmetic average roughness of the entire surface of the crosslinked fluorine resin coating film influence oil repellency and reduction of torque in oil. However, if the contribution of the arithmetic average roughness Ra1 of the surface having the waveform is dominant and the value of the arithmetic average roughness Ra1 of the surface having the waveform is low, even when the value of the arithmetic average roughness of the entire surface of the crosslinked fluorine resin coating film is high, a sufficient effect is achieved. As a preferable embodiment, it is found that the oil repellency and the torque reduction effect in the oil tend to be larger when both of the values of the arithmetic average roughness Ra1 of the surface having the waveform and the arithmetic average roughness of the entire surface of the crosslinked fluorine resin coating film are lower. Generally, the accuracy of the film thickness of the outer layer, containing the crosslinked fluorine resin as a main component, of the sliding member to be used in the oil refers to a film thickness deviation of large waviness of several millimeters to several tens of millimeters (low frequency waviness). However, it is found that a fine roughness component (hereinafter, also referred to as high frequency waviness) having a frequency of 0.1 µm to several tens of micrometers which exists on a surface having large waviness of several millimeters to several tens of millimeters (hereinafter, also referred to as low frequency waviness) actually involves the oil repellency of the outer layer containing the crosslinked fluorine resin as a main component. On the other hand, it is found that when, by polishing, the accuracy of the film thickness is corrected, that is, the above low frequency waviness is removed, the high frequency waviness is increased and the oil repellency is decreased. As a result of the above, the present inventor has found that in the outer layer, containing the crosslinked fluorine resin as a main component, of the sliding member to be used in the oil, it is necessary to control a fine roughness component (high frequency waviness) having a frequency of 0.1 µm to several tens of micrometers which exists on the surface having low frequency waviness while leaving the low frequency waviness on the surface of the outer layer containing the crosslinked fluorine resin as a main component. As described above, the sliding member has excellent oil repellency and torque reduction effect when the arithmetic average roughness Ra1 of a surface having a waveform (hereinafter, also referred to as "arithmetic average roughness Ra1 of a high frequency surface") obtained by extracting a frequency component of a region having waviness having a frequency of not lower than 0.1 µm and not higher than 100.0 µm on the surface of the outer layer through fast Fourier transform processing, and performing inverse Fourier transform processing on data of a frequency component of a region having waviness having a frequency of not lower than 0.1 µm and not higher than 10.0 µm out of the extracted frequency component, is not greater than 0.035 µm. As the mechanism by which the arithmetic average roughness Ra1 of the surface having the waveform reduces the oil repellency and the torque during sliding, the influence of the surface is considered. The arithmetic average roughness Ra1 defines the unevenness in a very fine region when viewed from the entire sliding surface, but is inferred to influence the affinity between the crosslinked fluorine resin and the oil. Therefore, it is considered that since the surface area is smaller when Ra1 is lower, it is difficult for the crosslinked fluorine resin and the oil to interact with each other, so that the torque is reduced.

Here, the "waviness" refers to waveform data regarding waviness based on information regarding the unevenness of a sample surface obtained by using a confocal laser scanning microscope. The "main component" refers to a component having the highest content ratio in terms of mass, for example, a component having a content of not less than 60% by mass.

In the sliding member, the arithmetic average roughness Ra1 of the surface having the waveform is preferably not greater than 0.025 µm. When the arithmetic average roughness Ra1 of the surface having the waveform is not greater than 0.025 µm as described above, the oil repellency and the torque reduction effect can be further enhanced.

In the sliding member, the outer layer preferably has an average thickness of not less than 0.1 µm and not greater than 70.0 µm. When the average thickness of the outer layer is in the above range, the sliding member can improve the scratch resistance when foreign matter is bitten thereinto, while having good elasticity. As a result, the sliding member can be used as a sliding material that can withstand long-term use. Here, the "average thickness" means the average value of thicknesses measured at any ten points.

Preferably, the outer layer is a coating layer or is composed of a film. When the outer layer is a coating layer or is composed of a film, it is easy to control the roughness of the surface of the outer layer and the accuracy of the average thickness of the outer layer.

The sliding member may be used in an oil pump. Since the sliding member has excellent oil repellency, when the sliding member is used as a sliding member for an oil pump in which the surface on which the outer layer is laminated is a sliding surface, a frictional force applied to the sliding surface is reduced, so that it is possible to provide a sliding member for an oil pump having an excellent torque reduction effect.

Moreover, a method for producing a sliding member according to another aspect of the present disclosure includes: a step of laminating an outer layer containing a fluorine resin as a main component, directly on a surface of a sliding member body containing a metal as a main component; and a step of irradiating the outer layer with ionizing radiation, and an arithmetic average roughness Ra1 of a surface having a waveform obtained by extracting a frequency component of a region having waviness having a frequency of not lower than 0.1 µm and not higher than 100.0 µm on a surface of the outer layer through fast Fourier transform processing, and performing inverse Fourier transform processing on data of a frequency component of a region having waviness having a frequency of not lower than 0.1 µm and not higher than 10.0 µm out of the extracted frequency component, is not greater than 0.05 µm.

As described above, a fine roughness component (high frequency waviness) having a frequency of 0.1 µm to several tens of micrometers which exists on the surface having low frequency waviness which is large waviness of several millimeters to several tens of millimeters, actually involves the oil repellency of the outer layer containing the crosslinked fluorine resin as a main component. On the other hand, when, by polishing, the accuracy of the film thickness is corrected, that is, the above low frequency waviness is removed, the high frequency waviness is increased and the oil repellency is decreased. Therefore, in the method for producing the sliding member, in the outer layer, containing the crosslinked fluorine resin as a main component, of the sliding member to be used in oil, it is necessary to control a fine roughness component (high frequency waviness) having a frequency of 0.1 μm to several tens of micrometers which exists on the surface having low frequency waviness while leaving the low frequency waviness on the surface of the outer layer. In the method for producing the sliding member, the need for the above polishing is eliminated by the step of laminating the outer layer in which the high frequency surface has an arithmetic average roughness Ra1 of not greater than 0.035 μm. The sliding member obtained by the method for producing the sliding member has excellent oil repellency and torque reduction effect, since the arithmetic average roughness Ra1 of the high frequency surface obtained by extracting a frequency component of a region having waviness having a frequency of not lower than 0.1 μm and not higher than 100.0 μm on the surface of the outer layer through fast Fourier transform processing, and performing inverse Fourier transform processing of data of a frequency component of a region having waviness having a frequency of not lower than 0.1 μm and not higher than 10.0 μm out of the extracted frequency component, is not greater than 0.035 μm. Therefore, with the method for producing the sliding member, it is possible to easily and reliably produce a sliding member having excellent oil repellency and torque reduction effect.

In the method for producing a sliding member, the laminating step is preferably performed by electrostatic coating using a paint containing a fluorine resin as a main component, by dip coating using a paint containing a fluorine resin as a main component, or by thermocompression bonding of a film containing a fluorine resin as a main component to the sliding member body. In the laminating step, by using electrostatic coating, dip coating, or thermocompression bonding of a film to the sliding member body, the arithmetic average roughness Ra1 of the high frequency surface obtained by extracting a frequency component of a region having waviness having a frequency of not lower than 0.1 μm and not higher than 100.0 μm on the surface of the outer layer through fast Fourier transform processing, and performing inverse Fourier transform processing on data of a frequency component of a region having waviness having a frequency of not lower than 0.1 μm and not higher than 10.0 μm out of the extracted frequency component, can be more reliably controlled to be in a range of not greater than 0.035 μm. In addition, a sliding member having excellent oil repellency and torque reduction effect can be efficiently produced without the need for a conventionally-performed step of polishing the surface of a crosslinked fluorine resin layer.

Details of Embodiments of the Present Disclosure

Hereinafter, a sliding member according to an embodiment of the present disclosure will be described in detail with reference to the drawings.
<Sliding Member>

A sliding member according to an embodiment of the present disclosure includes a sliding member body containing a metal as a main component, and an outer layer laminated directly on a surface of the sliding member body and containing a crosslinked fluorine resin as a main component. FIG. 1 is a schematic cross-sectional view showing a sliding member 1 according to an embodiment of the present disclosure. The sliding member 1 in FIG. 1 has a plate shape. The sliding member 1 includes a plate-shaped sliding member body 2 having a one-side front surface (in FIG. 1, the upper surface of the sliding member body 2) and an other-side back surface (in FIG. 1, the lower surface of the sliding member body 2), and an outer layer 3 laminated directly on the one-side front surface of the sliding member body 2.

[Sliding Member Body]

The sliding member body 2 contains a metal as a main component. Examples of the metal include iron alloys such as stainless steel, nickel, aluminum, aluminum alloys, copper, and copper alloys. As the metal, among them, stainless steel or nickel is preferable since these metals have excellent malleability and heat resistance. As the metal, one of the metals may be used alone, or two or more of the metals may be used in combination.

The shape of the sliding member body 2 is not particularly limited and can be appropriately changed according to the intended use. For example, the shape is not limited to a plate shape, a cylindrical shape, a conical shape, an elliptical cone shape, a pyramidal shape, a gourd shape, an elliptical column shape, and a prism shape, and the shapes of various sliding parts such as a rotor can be adopted.

The average thickness of the sliding member body 2 is not particularly limited and can be appropriately changed according to the intended use. In addition, the sliding surface of the sliding member body 2 does not have to be flat, and a pattern of grooves, dimples (recesses) or the like may be formed on the surface. Moreover, the sliding member body 2 may have a through hole.

[Outer Layer]

The outer layer 3 is laminated directly on the surface of the sliding member body 2 and contains a crosslinked fluorine resin as a main component. Since the outer layer 3 contains the crosslinked fluorine resin as a main component, the outer layer 3 has excellent wear resistance.

The outer layer 3 does not have to be laminated on the entire surface of the sliding member body 2, and may be laminated on at least the sliding surface of the sliding member body 2. For example, in the case where the sliding member body 2 has a plate shape as shown in FIG. 1, the outer layer 3 may be laminated directly only on a part of the one-side front surface of the sliding member body 2, or may be laminated directly on the one-side front surface and the other-side back surface of the sliding member body 2. Furthermore, in the case where the sliding member body has a cylindrical shape, the outer layer may be laminated directly on the entirety of the outer peripheral surface of the sliding member body, or may be laminated directly only on a part of the outer peripheral surface of the sliding member body.

Preferably, the outer layer is a coating layer or is composed of a film. When the outer layer is composed of a coating layer or a film, it is easy to control the roughness of the surface of the outer layer and the accuracy of the average thickness of the outer layer.

The crosslinked fluorine resin is obtained by irradiating a fluorine resin with ionizing radiation. Here, the "fluorine resin" refers to a resin obtained by substituting at least one hydrogen atom bonded to a carbon atom constituting the polymerization unit of a polymer chain with a fluorine atom or an organic group having a fluorine atom (hereinafter, also referred to as "fluorine atom-containing group"). The fluorine atom-containing group is a group obtained by substituting at least one hydrogen atom in a linear or branched organic group with a fluorine atom, and examples of the fluorine atom-containing group include fluoroalkyl groups, fluoroalkoxy groups, and fluoropolyether groups.

Examples of the fluorine resin include polytetrafluoroethylene (PTFE), tetrafluoroethylene-perfluoroalkoxyethylene copolymer (PFA), tetrafluoroethylene-hexafluoropropylene copolymer (FEP), polyvinylidene fluoride (PVDF), tetrafluoroethylene-ethylene copolymer (ETFE), polychlorotrifluoroethylene (PCTFE), chlorotrifluoroethylene-ethylene copolymer (ECTFE), polyvinylfluoride (PVF), fluoroolefinvinyl ether copolymer, vinylidene fluoride-ethylene tetrafluoride copolymer, and vinylidene fluoride-propylene hexafluoride copolymer. As the fluorine resin, among them, PTFE, PFA, and FEP are preferable, PFA and PTFE are more preferable, and from the viewpoint of wear resistance, chemical resistance, and heat resistance, PTFE is further preferable. As the fluorine resin, one of the fluorine resins may be used alone, or two or more of the fluorine resins may be used in combination.

The fluorine resin may contain a structural unit derived from another copolymerizable monomer as long as the effects of the present disclosure are not impaired. For example, PTFE may contain a structural unit such as perfluoro(alkyl vinyl ether), hexafluoropropylene, (perfluoroalkyl)ethylene, and chlorotrifluoroethylene. The upper limit of the content ratio of the structural unit derived from the other copolymerizable monomer is, for example, 3% by mole with respect to all the structural units constituting the fluorine resin.

The lower limit of the content of the crosslinked fluorine resin in the outer layer 3 is preferably 60% by mass, more preferably 85% by mass, and further preferably 98% by mass. In addition, the content of the crosslinked fluorine resin may be 100% by mass. If the content of the crosslinked fluorine resin is lower than the lower limit, the oil repellency of the sliding member 1 may be insufficient.

The upper limit of an arithmetic average roughness Ra1 of a high frequency surface obtained by extracting a frequency component of a region (low frequency waviness) having waviness having a frequency of not lower than 0.1 μm and not higher than 100.0 μm on the surface of the outer layer through fast Fourier transform processing, and performing inverse Fourier transform processing on data of a frequency component of a region (high frequency waviness) having waviness having a frequency of not lower than 0.1 μm and not higher than 10.0 μm out of the extracted frequency component, is 0.035 μm and more preferably 0.025 μm. When the arithmetic average roughness Ra1 of the high frequency surface is in the above range, the sliding member has excellent oil repellency and torque reduction effect.

Figure 2:
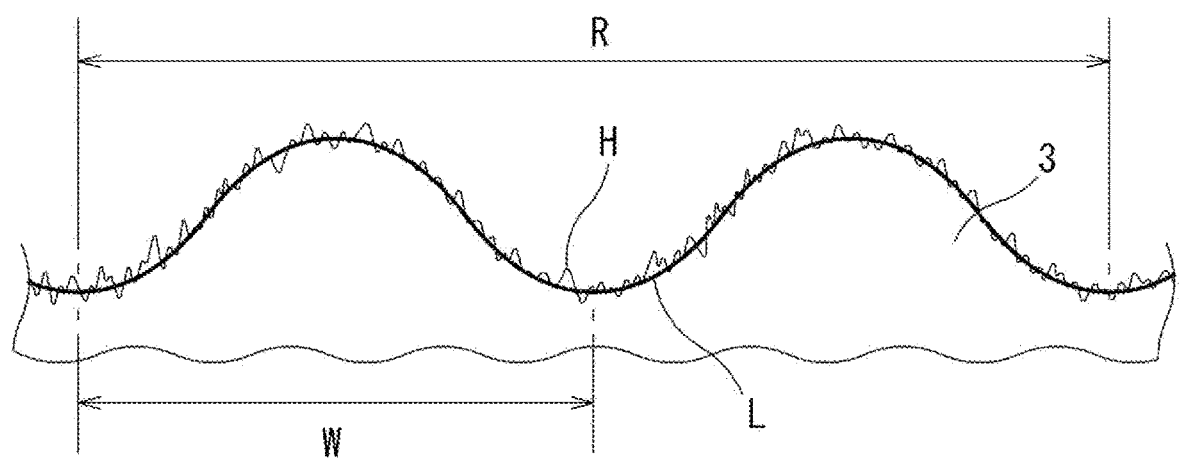
FIG. 2 is a schematic diagram showing a surface of an outer layer of the sliding member according to the first embodiment.

FIG. 2 is a schematic diagram showing the surface of the outer layer 3 of the sliding member 1 according to the first embodiment. The specific measurement procedure for the arithmetic average roughness Ra1 of the high frequency surface will be described with reference to FIG. 2. In FIG. 2, "W" indicates frequency.

(1) First, a frequency component of a region having waviness having a frequency of not lower than 0.1 μm and not higher than 100.0 μm on the surface of the outer layer 3 as a sample is extracted through fast Fourier transform processing. Specifically, a frequency component of a region having waviness having a frequency of not lower than 0.1 μm and not higher than 100.0 μm (low frequency waviness: L in FIG. 2) is extracted by performing fast Fourier transform processing on data at 2000 plot points every 0.05 μm with a range between any two points (R in FIG. 2) at an interval of 100 μm on the surface of the outer layer 3 as an evaluation range, using a confocal laser scanning microscope.

(2) A waveform is generated by synthesizing data of a frequency component of a region having waviness having a frequency of not lower than 0.1 μm and not higher than 10.0 μm (high frequency waviness: H in FIG. 2) out of the extracted frequency component through inverse Fourier transform processing.

(3) The arithmetic average roughness Ra1 of a surface having the generated waveform is obtained.

The upper limit of an arithmetic average roughness Ra2 of the surface of the outer layer is 1.0 μm and more preferably 0.5 μm. When the arithmetic average roughness Ra2 of the surface of the outer layer is in the above range, the sliding member has further improved oil repellency and torque reduction effect. As for the arithmetic average roughness Ra2 of the surface of the outer layer, one-dimensional waveform data of the surface of the outer layer over 100 μm is acquired using a confocal laser scanning microscope, and the arithmetic average roughness Ra2 of the surface of the outer layer is measured using the one-dimensional waveform data.

The lower limit of the average thickness of the outer layer 3 is preferably 0.1 μm and more preferably 5 μm. Meanwhile, the upper limit of the average thickness is preferably 70.0 μm and more preferably 50.0 μm. If the average thickness is less than 0.1 μm, the scratch resistance when foreign matter is bitten may decrease. On the other hand, if the average thickness exceeds 70.0 μm, the elasticity of the sliding member 1 may decrease.

This sliding member has excellent oil repellency and torque reduction effect. Therefore, the sliding member 1 is suitable for use as a sliding member for applications where contact with oil occurs, such as an oil pump and a compressor. In particular, the sliding member is suitable as a rotating body, and may be used in an oil pump. Since the sliding member has excellent oil repellency, when the sliding member is used as a sliding member for an oil pump in which the surface on which the outer layer is laminated is a sliding surface, a frictional force applied to the sliding surface is reduced, so that it is possible to provide a sliding member for an oil pump having an excellent torque reduction effect.

<Method for Producing Sliding Member>

A method for producing the sliding member includes a step of laminating an outer layer containing a fluorine resin as a main component, directly on a surface of a sliding member body containing a metal as a main component, and a step of irradiating the outer layer with ionizing radiation.

(Laminating Step)

In this step, an outer layer containing a fluorine resin as a main component is laminated directly on a surface of a sliding member body containing a metal as a main component.

The laminating step is preferably performed by electrostatic coating using a paint containing a fluorine resin as a main component, by dip coating using a paint containing a fluorine resin as a main component, or by thermocompression bonding of a film containing a fluorine resin as a main component to the sliding member body. As described above, in order to improve the oil repellency and the torque reduction effect of the outer layer, containing the crosslinked fluorine resin as a main component, of the sliding member to be used in oil, it is necessary to control a fine roughness component (high frequency waviness) having a frequency of 0.1 μm to several tens of micrometers which exists on a surface having low frequency waviness while leaving the low frequency waviness on the surface of the outer layer. In the laminating step, by using electrostatic coating, dip coating, or thermocompression bonding of a film to the sliding member body, the arithmetic average roughness Ra1 of the high frequency waviness surface obtained by extracting a frequency component of a region having waviness having a frequency of not lower than 0.1 μm and not higher than 100.0 μm on the surface of the outer layer through fast Fourier transform processing, and performing inverse Fourier transform processing on data of a frequency component of a region having waviness having a frequency of not lower than 0.1 μm and not higher than 10.0 μm out of the extracted frequency component, can be more reliably controlled to be in a range of not greater than 0.035 μm. In addition, a sliding member having excellent oil repellency and torque reduction effect can be more efficiently produced without the need for a conventionally-performed step of polishing the surface of a crosslinked fluorine resin layer.

In the case of performing electrostatic coating using a paint containing a fluorine resin as a main component or dip coating using a paint containing a fluorine resin as a main component, a paint obtained by dispersing or dissolving a fluorine resin composition in a solvent is applied as the paint containing a fluorine resin as a main component, to the outer peripheral surface of the sliding member body. As the solvent, a mixed solution of water and an emulsifier, water and an alcohol, water and acetone, water, an alcohol, and acetone, or the like, which allows the fluorine resin to be efficiently dispersed therein, can be used.

The lower limit of the solid content concentration of the paint is preferably 5% by mass, more preferably 25% by mass, and further preferably 40% by mass. Meanwhile, the upper limit of the solid content concentration of the paint is preferably 60% by mass, more preferably 50% by mass, and further preferably 45% by mass. When the solid content concentration of the paint is set to be in the above range, the coatability can be improved, and as a result, a coating film having few coating defects can be easily and reliably formed.

The lower limit of the viscosity of the paint is preferably 100 cP and more preferably 180 cP. Meanwhile, the upper limit of the viscosity of the paint is preferably 800 cP and more preferably 400 cP. When the viscosity of the paint is set to be in the above range, the coatability can be improved, and as a result, a coating film having few coating defects can be easily and reliably formed. Here, the "viscosity" refers to a value measured according to JIS-K5600-2-2:1999 "Testing methods for paints—Part 2: Characteristics and stability of paints—Section 2: Viscosity".

In the case of performing thermocompression bonding of a film to the sliding member body in the above laminating step, the lower limit of the heating temperature of the film is preferably the melting point of the fluorine resin − 20° C., and more preferably the melting point. Meanwhile, the upper limit of the heating temperature is preferably the melting point of the fluorine resin +60° C., and more preferably the melting point +30° C. If the heating temperature is less than the lower limit, the adhesion between the film and the sliding member body may be insufficient. On the other hand, if the heating temperature exceeds the upper limit, the releasability from a mold with which compression bonding is performed deteriorates, and the fluorine resin is peeled off and transferred to the mold, so that the compression bonding surface does not become smooth in some cases.

In the case of performing thermocompression bonding of a film to the sliding member body, the upper limit of the pressure for pressing is preferably 50 MPa and more preferably 10 MPa. Meanwhile, the lower limit of the pressure is preferably 10 kPa and more preferably 100 kPa. If the pressure is less than the lower limit, the adhesion between the film and the sliding member body may be insufficient. On the other hand, if the pressure exceeds the upper limit, the sliding member body or a pressing jig may be broken, or the facility cost may increase.

In the case of performing thermocompression bonding of a film to the sliding member body, the heating and pressing time can be, for example, not shorter than 5 minutes and not longer than 2 hours. In addition, the pressing time can be shortened by performing compression bonding using a high frequency welding machine while applying high frequency waves.

After the above electrostatic coating, dip coating, or thermocompression bonding of a film is performed, the sliding member body is placed in a heating furnace and heated therein to bake the fluorine resin. By the baking, the solvent in the paint can be vaporized. The heating temperature when baking the fluorine resin layer can be, for example, not lower than 350° C. and not higher than 450° C. In addition, the heating time when baking the coating film can be, for example, not shorter than 10 minutes and not longer than 60 minutes. When the heating temperature and the heating time are set to be in the above ranges, it is possible to form a film having excellent denseness while suppressing decomposition of the fluorine resin. Then, the sintered layer is cooled, whereby the outer layer is laminated on the surface of the sliding member body.

As described above, the outer layer does not have to be laminated on the entire surface of the sliding member body, and may be laminated on at least the sliding surface of the sliding member body.

[Irradiating Step]

In this step, the outer layer is irradiated with ionizing radiation. The fluorine resin can be crosslinked by the irradiating step. In this step, the outer layer is irradiated with ionizing radiation under a low oxygen atmosphere and at a temperature equal to or higher than the melting point of the fluorine resin. This step is preferably performed before the laminating step. By performing this step before the laminating step as described above, deterioration of the sliding member body due to irradiation with ionizing radiation can be suppressed.

The heating temperature at the time of irradiation with ionizing radiation is, for example, not lower than 270° C. when the fluorine resin is FEP (melting point: 270° C.), not lower than 327° C. when the fluorine resin is PTFE (melting point: 327° C.), and not lower than 310° C. when fluorine resin is PFA (melting point: not lower than 304° C. and not higher than 310° C.).

The lower limit of the heating temperature is preferably a temperature higher than the melting point by 5° C. and more preferably a temperature higher than the melting point by 10° C. Meanwhile, the upper limit of the heating temperature is preferably a temperature higher than the melting point by 50° C. and more preferably a temperature higher than the melting point by 30° C. In addition, specifically, the heating temperature can be appropriately changed according to the type of the fluorine resin, and the lower limit thereof is preferably 320° C. and more preferably 330° C. Meanwhile, the upper limit of the heating temperature is preferably 480° C. and more preferably 350° C. By irradiation with ionizing radiation at the above heating temperature, it is possible to promote crosslinking between molecules while suppressing cleavage of the main chain of the fluorine resin. When the heating temperature exceeds the upper limit, the fluorine resin may be decomposed. Here, the "melting point of the resin" refers to the melting point peak temperature measured by using a differential scanning calorimeter (DSC) according to JIS-K7121:2012 "Testing Methods for Transition Temperatures of Plastics".

The upper limit of the oxygen concentration under the low oxygen atmosphere is preferably 100 ppm, more preferably 10 ppm, and further preferably 5 ppm. If the oxygen concentration exceeds the upper limit, the fluorine resin may be decomposed by irradiation with ionizing radiation.

Examples of the ionizing radiation include γ-rays, electron beams, X-rays, neutron rays, and high-energy ion rays, and electron beams are preferable. In addition, the lower limit of the irradiation dose of the ionizing radiation is preferably 10 kGy, more preferably 70 kGy, and further preferably 200 kGy. Meanwhile, the upper limit of the irradiation dose is preferably 2,000 kGy, more preferably 1,200 kGy, and further preferably 400 kGy. If the irradiation dose is lower than the lower limit, the crosslinking reaction of the fluorine resin may not proceed sufficiently. On the other hand, if the irradiation dose exceeds the upper limit, the main chain of the fluorine resin may be cleaved. Therefore, by setting the irradiation dose to be in the above range, it is possible to cause the crosslinking to sufficiently proceed while suppressing cleavage of the main chain of the fluorine resin. The acceleration voltage can be, for example, not less than 800 kV and not greater than 1,500 kV.

In the method for producing the sliding member, in the outer layer, containing the crosslinked fluorine resin as a main component, of the sliding member to be used in oil, it is possible to control a fine roughness component (high frequency waviness) having a frequency of 0.1 μm to several tens of micrometers which exists on the surface having low frequency waviness while leaving the low frequency waviness on the surface of the outer layer. In the method for producing the sliding member, the need for the above polishing is eliminated by the step of laminating the outer layer in which the surface having the waveform has an arithmetic average roughness Ra1 of not greater than 0.035 μm. The sliding member obtained by the method for producing the sliding member has excellent oil repellency and torque reduction effect, since the arithmetic average roughness Ra1 of the surface having the waveform obtained by extracting a frequency component of a region having waviness having a frequency of not lower than 0.1 μm and not higher than 100.0 μm on the surface of the outer layer through fast Fourier transform processing, and performing inverse Fourier transform processing of data of a frequency component of a region having waviness having a frequency of not lower than 0.1 μm and not higher than 10.0 μm out of the extracted frequency component, is not greater than 0.035 μm. Therefore, with the method for producing the sliding member, it is possible to easily and reliably produce a sliding member having excellent oil repellency and torque reduction effect.

Other Embodiments

The embodiments disclosed herein are illustrative in all aspects and should not be recognized as being restrictive. The scope of the present disclosure is not limited to the configuration of the above embodiment, but is defined by the scope of the claims and is intended to include meaning equivalent to the scope of the claims and all modifications within the scope.

EXAMPLES

Hereinafter, the present invention will be more specifically described by means of examples, but the present invention is not limited to the examples below.
<Sliding Members No. 1 to No. 11>
[No. 1]
A sliding member No. 1 having only a sliding member body was obtained in the same manner as the other test examples, except that an outer layer was not laminated on a sliding member body containing a metal as a main component.
[No. 2, No. 3, and No. 8]
PFA powder ("MJ-103" of Chemours-Mitsui Fluoroproducts Co., Ltd., particle size: 30 μm) was coated on a stainless steel plate having an average thickness of 1 mm as a sliding member body. Next, the PFA was baked at 350° C. for 20 minutes, and then, as the irradiating step described above, the PFA was heated to 330° C. under a low oxygen atmosphere having an oxygen concentration of 5 volume ppm or less, and irradiated with electron beams from the outer surface side of the stainless steel plate by using an electron beam accelerator (manufactured by Nissin Electric Co., Ltd.). As the irradiation conditions, the acceleration voltage was set to 1000 kV, and the irradiation dose was set to 300 kGy.

A one-side front surface of the crosslinked PTFE film was roughened by using sandpaper having a grit size of #400 ("Waterproof Paper" manufactured by Noritake Coated Abrasive Co., Ltd.) to adjust the surface roughness of the outer layer. A PTFE film was obtained.
[Sliding Members No. 4, No. 5, No. 9, and No. 10]
A fluorine resin film containing PTFE as a main component ("VALFLON Sheet" of VALQUA, LTD., average thickness 100 μm) on a stainless steel plate having an average thickness of 1 mm as a sliding member body was irradiated with electron beams at an acceleration voltage of 1000 kV and an irradiation dose of 300 kGy to place the obtained crosslinked PTFE on the stainless steel plate having an average thickness of 1 mm, and the crosslinked PTFE was heated at 350° C. for 1 hour using a nitrogen furnace while being pressed at 100 kPa, to obtain a sliding member having the crosslinked PTFE laminated thereon.
[Sliding Members No. 6 and No. 11]
Using an electrostatic coating machine (PDR-12 model manufactured by Nagase Techno Engineering Co., Ltd.) for a one-side front surface of a stainless steel plate having an average thickness of 1000 μm, PTFE powder ("AD2CRER" manufactured by DAIKIN INDUSTRIES, LTD.) was electrostatically spray-coated on the earthed stainless steel plate having a thickness of 1 mm, a width of 50 mm, and a length of 80 mm and separated from the machine by 25 cm, at a coating voltage of 15 Kv (negative) and a discharge rate of about 0.03 g/min. Next, the PTFE coating film was baked by heating at 380° C. for 30 minutes in a thermostat bath to fuse the PTFE coating film to the stainless steel plate, thereby forming a fluorine resin layer. A laminate in which a fluorine resin layer having an average total thickness of 30 μm was laminated on the stainless steel plate was obtained. Then, the laminate was irradiated with electron beams under the same conditions as for No. 2.

[Sliding Member No. 7]

A stainless steel plate having an average thickness of 1 mm as a sliding member body was dipped in a paint containing PTFE as a main component, and pulled up at a speed of 5 mm/sec to be coated with the paint. The solid content concentration of the paint was 43% by mass, the viscosity of the paint was 500 cP, and "EK-3700C21R" manufactured by DAIKIN INDUSTRIES, LTD. was used as the paint. Then, the PTFE coating film was baked by heating at 380° C. for 30 minutes to fuse the PTFE coating film to the stainless steel plate, thereby forming a fluorine resin layer. A laminate in which a fluorine resin layer having an average total thickness of 30 μm was laminated on the stainless steel plate was obtained. Then, the laminate was irradiated with electron beams under the same conditions as for No. 2.

<Evaluation>

Next, the sliding members No. 1 to No. 11 were evaluated for arithmetic average roughness Ra1 of high frequency waviness surface, oil repellency, torque, and clearance.

[Arithmetic Average Roughness Ra1 of High Frequency Waviness Surface]

As for the arithmetic average roughness Ra1 of a high frequency waviness surface, one-dimensional waveform data of the surface was obtained over 100 μm in a high accuracy and high definition mode using KEYENCE VK-X1000 microscope with a 150×lens, and the arithmetic average roughness Ra1 of the high frequency waviness surface was measured through fast Fourier transform processing and inverse Fourier transform processing on the one-dimensional waveform data.

The arithmetic average roughnesses Ra1 of the high frequency waviness surfaces of the sliding members No. 1 to No. 11 were evaluated at the following three scales, and the sliding members evaluated as A or B were determined to be acceptable.

A: Ra1 is not greater than 0.04.
B: Ra1 is greater than 0.04 and not greater than 0.06.
C: Ra1 is greater than 0.06.

[Arithmetic Average Roughness Ra2 of Outer Layer Surface]

The arithmetic average roughness Ra2 of the outer layer surface was measured based on the following procedure.

One-dimensional waveform data of the outer layer surface was obtained over 100 μm in a high accuracy and high definition mode using KEYENCE VK-X1000 microscope with a 150×lens, and then the arithmetic average roughness Ra2 of the outer layer surface was measured using the one-dimensional waveform data.

[Oil Repellency]

The sliding members No. 1 to No. 11 were evaluated for oil repellency according to the following procedure. 0.02 g of transmission oil was spread on the surface of the outer layer of each of the sliding members No. 1 to No. 11 with a brush in a circle having a diameter of about 10 mm. Then, the time (seconds) until the shape of an oil droplet became stable on the surface of the outer layer of the sliding member was measured. The shorter the time is, the better the oil repellency is. The oil repellency of the sliding members No. 1 to No. 11 was evaluated at the following three scales, and the sliding members evaluated as A or B were determined to be acceptable.

A: 3 seconds or shorter
B: 6 seconds or shorter
C: 8 seconds or longer (equivalent to conventional products)

[Torque]

For a sliding member for an oil pump, torque [cN·m] was measured according to the following procedure.

The oil pomp of a commercially available car, Honda VEZEL, was disassembled, and an oil pump rotor coated with a crosslinked fluorine was placed on a casing with the casing located below the oil pump rotor, and was fixed such that the shaft of the oil pump rotor was vertically directed upward. 0.01 g of transmission oil was weighed, added between the casing and the oil pump rotor, and spread over the entire circumference by manually rotating the rotor by 5 turns. Then, TOHNICHI torque driver FTD5CN-S model was connected to the shaft of the oil pump rotor, and rotated at a speed of 10 rpm, and the torque was measured when the oil pump rotor was rotated by one turn through the torque driver.

(Clearance)

An oil pump was produced using an oil pump rotor, for an oil pump, having the same configuration as in each example or comparative example, and a clearance that is the distance between a casing and the oil pump rotor was measured according to the following procedure. The maximum clearance is 40 μm. The clearance is better when the clearance is more uniform and the range thereof is narrower. The sliding members No. 1 to No. 11 were evaluated in the following three stages, and the sliding members evaluated as A or B were determined to be acceptable.

A: Clearance is in a range of not greater than 10 μm.
B: Clearance is in a range of greater than 10 μm and not greater than 20 μm.
C: Clearance is in a range of greater than 20 μm and not greater than 40 μm.

Table 1 shows the evaluation results of the wear test, the friction test, and the surface roughness for the sliding members No. 1 to No. 11. "-" in table 1 indicates not having the corresponding configuration.

TABLE 1

| | Outer layer | | | Evaluation | | | | |
|---|---|---|---|---|---|---|---|---|
| Test No. | Outer layer configuration | Form | Laminating method | Arithmetic average roughness Ra1 [μm] of high frequency waviness surface of outer layer | Arithmetic average roughness Ra2 [μm] of outer layer surface | Oil repellency [seconds] | Torque [cN · m] | Clearance |
| 1 | — | — | — | — | — | No oil repellency | 7.0 | C |
| 2 | Crosslinked PFA | Coating layer | Powder coated and normally polished product | C 0.102 | 0.343 | C 11 | 2.0 | C |
| 3 | Crosslinked PFA | Coating layer | Powder coated and precisely polished product | C 0.042 | 0.190 | C 8 | 1.5 | B |

TABLE 1-continued

| Test No. | Outer layer configuration | Outer layer Form | Laminating method | Arithmetic average roughness Ra1 [μm] of high frequency waviness surface of outer layer | Arithmetic average roughness Ra2 [μm] of outer layer surface | Oil repellency [seconds] | Torque [cN·m] | Clearance |
|---|---|---|---|---|---|---|---|---|
| 4 | Crosslinked PTFE | Film | Thermocompression bonding | B 0.029 | 0.317 | B 6 | 1.2 | A |
| 5 | Crosslinked PTFE | Film | Thermocompression bonding | A 0.019 | 0.091 | A 2 | 0.7 | A |
| 6 | Crosslinked PTFE | Coating layer | Electrostatic coating | A 0.024 | 0.170 | A 3 | 0.8 | A |
| 7 | Crosslinked PTFE | Coating layer | Dip coating | A 0.011 | 0.035 | A 3 | 0.8 | A |
| 8 | Crosslinked PFA | Coating layer | Powder coated and precisely polished product | C 0.051 | 0.413 | C 9 | 1.5 | C |
| 9 | Crosslinked PTFE | Film | Thermocompression bonding | B 0.028 | 0.221 | B 6 | 1.2 | A |
| 10 | Crosslinked PTFE | Film | Thermocompression bonding | A 0.021 | 0.131 | A 2 | 0.7 | A |
| 11 | Crosslinked PTFE | Coating layer | Electrostatic coating | B 0.034 | 0.289 | B 6 | 1.2 | A |

As shown in Table 1, for the sliding members No. 4 to No. 7 and No. 9 to No. 11, in each of which the arithmetic average roughness Ra1 of the surface having the waveform obtained through fast Fourier transform processing and inverse Fourier transform processing on the region having waviness having a frequency of not lower than 0.1 μm and not higher than 10.0 μm on the surface of the outer layer is not greater than 0.035 μm, good results were obtained in all of oil repellency, torque, and clearance. In particular, the sliding members No. 5 to No. 7 and No. 10 in each of which the arithmetic average roughness Ra1 of the surface having the waveform is not greater than 0.025 μm were excellent in these evaluations. On the other hand, the sliding members No. 2, No. 3, and No. 8 in each of which the arithmetic average roughness Ra1 of the surface having the waveform exceeds 0.035 μm were inferior in each of oil repellency, torque, and clearance even though the arithmetic average roughness Ra of the entire surface of the outer layer was in a relatively small range of not greater than 0.5 μm, since the arithmetic average roughness Ra1 of the high frequency surface exceeded 0.035 μm.

From the above, it is shown that the sliding member has excellent oil repellency and torque reduction effect.

Moreover, from the results of the sliding members No. 4 to No. 7 and No. 9 to No. 11, it is shown that, in the method for producing a sliding member, by using electrostatic coating, dip coating, or thermocompression bonding of a film to the sliding member body in the laminating step, the arithmetic average roughness Ra1 of the surface having the waveform obtained by extracting a frequency component of a region having waviness having a frequency of not lower than 0.1 μm and not higher than 100.0 μm on the surface of the outer layer through fast Fourier transform processing, and performing inverse Fourier transform processing on data of a frequency component of a region having waviness having a frequency of not lower than 0.1 μm and not higher than 10.0 μm out of the extracted frequency component, can be reliably controlled to be in a range of not greater than 0.035 μm.

REFERENCE SIGNS LIST 1 sliding member
2 sliding member body
3 outer layer
H high frequency waviness
L low frequency waviness
R evaluation range
W frequency

The invention claimed is:

1. A sliding member comprising:
   a sliding member body containing a metal as a main component; and
   an outer layer laminated directly on a surface of the sliding member body and containing a crosslinked fluorine resin as a main component, wherein
   an arithmetic average roughness Ra1 of a surface having a waveform obtained by extracting a frequency component of a region having waviness having a frequency of not lower than 0.1 μm and not higher than 100.0 μm on a surface of the outer layer through fast Fourier transform processing, and performing inverse Fourier transform processing on data of a frequency component of a region having waviness having a frequency of not lower than 0.1 μm and not higher than 10.0 μm out of the extracted frequency component, is not greater than 0.035 μm.

2. The sliding member according to claim 1, wherein the arithmetic average roughness Ra1 of the surface having the waveform is not greater than 0.025 μm.

3. The sliding member according to claim 1, wherein the outer layer has an average thickness of not less than 0.1 μm and not greater than 70.0 μm.

4. The sliding member according to claim 1, wherein the outer layer is a coating layer or is composed of a film.

5. The sliding member according to claim 1, wherein the sliding member is used in an oil pump.

6. A method for producing a sliding member comprising:
   a step of laminating an outer layer containing a fluorine resin as a main component, directly on a surface of a sliding member body containing a metal as a main component; and
   a step of irradiating the outer layer with ionizing radiation, wherein
   an arithmetic average roughness Ra1 of a surface having a waveform obtained by extracting a frequency component of a region having waviness having a frequency of not lower than 0.1 µm and not higher than 100.0 µm on a surface of the outer layer through fast Fourier transform processing, and performing inverse Fourier transform processing on data of a frequency component of a region having waviness having a frequency of not lower than 0.1 µm and not higher than 10.0 µm out of the extracted frequency component, is not greater than 0.035 µm.

7. The method for producing a sliding member according to claim 6, wherein the laminating step is performed by electrostatic coating using a paint containing a fluorine resin as a main component, by dip coating using a paint containing a fluorine resin as a main component, or by thermocompression bonding of a film containing a fluorine resin as a main component to the sliding member body.

\* \* \* \* \*